(12) United States Patent
Miyazaki

(10) Patent No.: US 8,387,726 B2
(45) Date of Patent: Mar. 5, 2013

(54) LEGGED MOBILE ROBOT

(75) Inventor: Susumu Miyazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 39 days.

(21) Appl. No.: 13/152,724

(22) Filed: Jun. 3, 2011

(65) Prior Publication Data

US 2011/0297461 A1    Dec. 8, 2011

(30) Foreign Application Priority Data

Jun. 4, 2010   (JP) ................................. 2010-128490

(51) Int. Cl.
*B62D 57/032*   (2006.01)
(52) U.S. Cl. ............................................ 180/8.6; 901/1
(58) Field of Classification Search .................. 180/8.6; 901/1, 15, 28
See application file for complete search history.

(56) References Cited

U.S. PATENT DOCUMENTS

| | | | | |
|---|---|---|---|---|
| 5,318,471 A | * | 6/1994 | Glovier | 446/268 |
| 6,962,220 B2 | * | 11/2005 | Takenaka et al. | 180/8.6 |
| 7,111,696 B2 | * | 9/2006 | Miyazaki et al. | 180/8.5 |
| 7,240,747 B2 | * | 7/2007 | Miyazaki et al. | 180/8.6 |
| 7,441,614 B2 | * | 10/2008 | Takemura et al. | 180/8.1 |

FOREIGN PATENT DOCUMENTS

JP    2004-298997    10/2004

* cited by examiner

*Primary Examiner* — Tony Winner
(74) *Attorney, Agent, or Firm* — Rankin, Hill & Clark LLP

(57) ABSTRACT

A robot 1 is equipped with a leg 2 including a knee joint 16 connecting a thigh link 32 and a crus link 34. The knee joint 16 is equipped with a connecting rod 44, one end of which is connected so as to be freely rotatable with respect to an axis 40 of the crus link 34 and the other end of which is connected so as to be freely rotatable to an axis 42 of the thigh link 32, and a distance varying mechanism 50 which changes the distance between an axis 60 of the crus link 34 and an axis 56 of the thigh link 32 by a driving force of an electric motor 40. When a bending angle of the knee joint 16 is 0 degree, a sum of the distance between the axis 40 and axis 42 and the distance between the axis 60 and the axis 56, is smaller than the distance between the axis 40 and the axis 56.

8 Claims, 4 Drawing Sheets

LEGGED MOBILE ROBOT

BACKGROUND OF THE INVENTION

1. Field of the Invention

The present invention relates to a legged mobile robot.

2. Description of the Related Art

There is known a legged mobile robot equipped with an upper body and legs, each leg including a hip joint connecting the upper body and a thigh link, a knee joint connecting the thigh link and a crus link, and an ankle joint connecting the crus link and a foot, which moves by driving the legs.

For example, Japanese Patent Laid-Open No. 2004-298997 discloses that the knee joint connecting the thigh link and the crus link has a knee Y axis (a pitch axis), and an output power from an electric motor arranged in the thigh link is transmitted to the knee Y axis via a belt and a reducer. A predetermined point of the crus link moves relative to the thigh link taking the knee Y axis as the center of rotation, generating a circular trajectory.

However, in the legged mobile robot disclosed in the above-mentioned Japanese laid-open patent, when the knee joint is almost fully stretched out, that is, when a joint angle (bending angle) of the knee joint stretches to the vicinity of 0 degree, the joint angle hardly varies even when driving power is transmitted to the crus link, so that the robot falls into a situation where drive controllability is impaired. Therefore, the knee joint can only be extended to the joint angle having good drive controllability.

Therefore, even when the robot is in the upright standing state, there is a necessity of bending the knee joint to a certain degree. Therefore, large torque must be acted on the knee joint, so that a problem that the driving source must be made larger and heavier arises. Further, a problem that a frequency of bending and stretching the hip joint and ankle joints are increased also arises. Still Further, the knee joint of a supporting leg cannot be made in a state where it is almost stretched out, so that the knee joint projects forward, and becomes susceptible to interfere with the knee of a free leg. In accordance thereto, a problem that the freedom of degree of walking gait is small, and that it is inferior in moving stability (balance) arises.

SUMMARY OF THE INVENTION

In view of such circumstances, an object of the present invention is to provide a legged mobile robot capable of increasing the knee joint angle with good drive controllability.

In order to achieve the above object, the present invention provides a legged mobile robot equipped with an upper body, and legs, each leg comprising a hip joint connecting the upper body and a thigh link, a knee joint connecting the thigh link and a crus link, and an ankle joint connecting the crus joint and a foot, in which the robot moves by driving the legs, the robot comprising; a connecting rod, one end of which is connected so as to be freely rotatable with respect to a first axis of the crus link, and the other end of which is connected so as to be freely rotatable to a second axis of the thigh link; and a distance varying mechanism which changes a distance between a third axis of the crus link and a fourth axis of the thigh link by a driving force from a driving source; wherein when a bending angle of the knee joint is 0 degree, a sum of the distance between the first axis and the second axis and the distance between the second axis and the fourth axis, is smaller than the distance between the third axis and the fourth axis.

According to the present invention, the crus link is driven by the distance varying mechanism with respect to the thigh link, and the second axis becomes the instantaneous center of rotation. And when the bending angle of the knee joint is 0 degree, the sum of the distance between the first axis and the second axis and the distance between the second axis and the fourth axis becomes smaller than the distance between the third axis and the fourth axis. Therefore, the fourth axis does not reach the bottom of a circle taking the first axis as a center thereof and taking the above-mentioned sum as the radius thereof.

Therefore, a value obtained by differentiating the distance between the predetermined point of the thigh link and the predetermined point of the crus link by the bending angle of the knee joint does not becomes 0 when the bending angle of the knee joint is 0 degree. By doing so, it becomes possible to drive control the knee joint angle well, even when the knee joint is in the vicinity of 0 degree, unlike the legged mobile robot according to the above-mentioned Japanese Laid-open patent.

According thereto, when the robot is in the upright standing state, it becomes possible to make the knee joint to a fully stretched, or to an almost fully stretched state, so that the torque acting on the knee joint is reduced. Therefore, the driving source may be made smaller in size and lighter in weight. Further, it becomes possible to reduce the frequency of bending and stretching the hip joint and the ankle joints, or the driving angles thereof.

Further, it becomes possible to make the knee joint of the supporting leg to a fully stretched or to an almost fully stretched state, so that the knee does not project forward, thereby suppressing the knee of the free leg interfering with the knee of the supporting leg. Therefore, the degree of freedom of the walking gait and the travel stability is increased, and the legged mobile robot is capable of performing various motions.

In the present invention, it is preferable to further comprise a connecting rod, one end of which is connected so as to be freely rotatable with respect to a fifth axis of the crus link, and the other end of which is connected so as to be freely rotatable to a sixth axis of the thigh link. In this case, the relative displacement of the thigh link and the crus link is restrained by the connecting rod, so that the relative displacement is stabilized.

Further in the present invention, it is preferable for the distance varying mechanism to comprise: a rotating plate which is rotary driven by the driving source about the third axis; and a connecting rod, one end of which is connected so as to be freely rotatable to an end of the rotating plate, and the other end of which is connected so as to be freely rotatable to the crus link at the fourth axis. In this case, it becomes possible to simply configure the distance varying mechanism. However, the configuration of the distance varying mechanism is not limited thereto, and may be the one using a linear driven rod, or a cam mechanism.

DETAILED DESCRIPTION OF THE PREFERRED EMBODIMENTS

Hereinafter, a legged mobile robot according to an embodiment of the present invention will be explained, taking a bipedal mobile robot 1 (hereinafter referred to as a robot 1) as an example.

Figure 1:
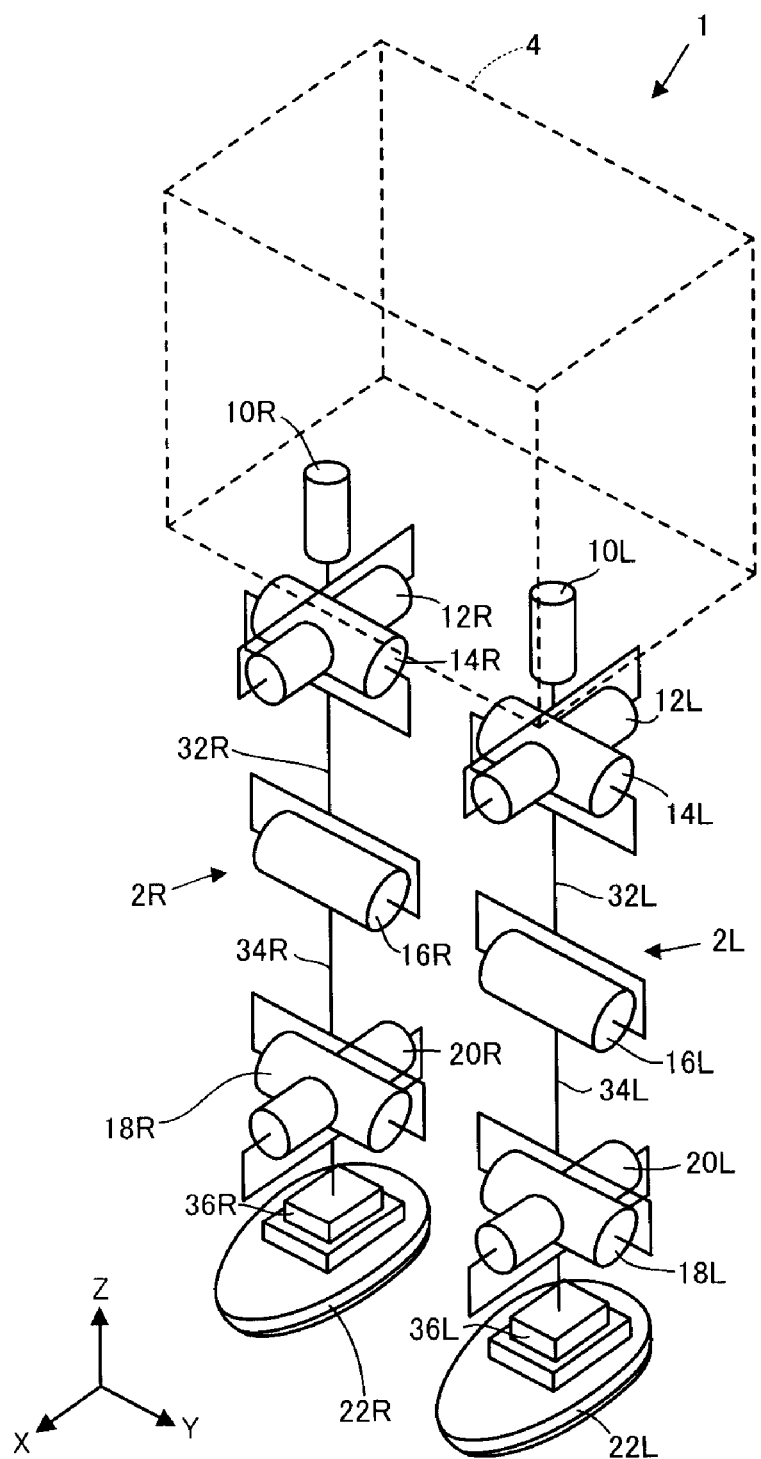
FIG. 1 is a perspective view showing a skeleton framework of a bipedal mobile robot according to an embodiment of the present invention.

As shown in FIG. 1, the robot 1 is equipped with a pair of left and right legs 2R, 2L, and an upper body 4 connected to a base end (upper end) of the legs 2R, 2L, and the upper body 4 is supported above a floor surface by the legs 2R, 2L in contact with the floor.

The legs 2R, 2L have the same configuration, and are each equipped with six joints. The six joints are, in order from the upper body 4 side, joints 10R, 10L for turning a hip (for turning in a yaw direction with respect to the upper body 4), joints 12R, 12L for rotating the hip in a roll direction (about an X-axis), joints 14R, 14L for rotating the hip in a pitch direction (about a Y-axis), joints 16R, 16L for rotating knees in the pitch direction, joints 18R, 18L for rotating ankles in the pitch direction, and joints 20R, 20L for rotating the ankles in the roll direction.

In the explanation of the present embodiment, references R and L mean that the same corresponds to the right-side leg and the left-side leg, respectively. Further, the X-axis direction and the Y-axis direction are two axis-directions that are orthogonal to each other on a horizontal plane, and the X-axis direction corresponds to the fore-and-aft direction (roll axis direction) of the robot 1, and the Y-axis direction corresponds to the lateral direction (pitch axis direction) of the robot 1. Moreover, the Z-axis direction is a perpendicular direction (direction of gravitational force), and corresponds to a vertical direction (yaw axis direction) of the robot 1.

The joint 10R(L), 12R(L), 14R(L) of each leg 2R(L) constitute a hip joint with three degrees of freedom, the joint 16R(L) constitutes a knee joint with one degree of freedom, and the joints 18R(L), 20R(L) constitute an ankle joint with two degrees of freedom.

Further, the hip joints 10R(L), 12R(L), and 14R(L) and the knee joint 16R(L) are connected by a thigh link 32R(L), and the knee joint 16R(L) and the ankle joints 18R(L), 20R(L) are connected by a crus link 34R(L). Moreover, a lower end of the ankle joints 18R(L), 20R(L) of each leg link 2R(L) is attached with a foot 22R(L) constituting the leading end (lower end) of each leg 2R(L). Further, the upper end (base end) of each leg 2R(L) is connected to the upper body 4 via the hip joints 10R(L), 12R(L), 14R(L).

With the above-mentioned configuration of each leg 2R(L), the foot 22R(L) of each leg 2R(L) has six degrees of freedom with respect to the upper body 4. Further, by driving each of the 6*2=12 joints of both legs 2R, 2L to an appropriate angle upon traveling of the robot 1, both feet 22R, 22L may perform desired motion. By doing so, the robot 1 is capable of performing motion of traveling in the three-dimensional space, such as a walking motion or running motion.

In the present embodiment, although not shown, a pair of left and right arms is fixed to both sides of the upper part of the upper body 4, and a head is mounted on the upper end of the upper body 4. Further, each arm is capable of performing motion such as swinging the arm in fore-and-aft direction with respect to the upper body 4, by a plurality of joints (shoulder joint, elbow joint, carpal joint, and the like) provided thereto. However, it is not necessary to provide the arms and the head.

A six-axis force sensor 36R(L) is provided between the ankle joint 18R(L), 20R(L) and the foot 22R(L) of each leg 2R(L). The six axis force sensor 36R(L) detects the translational force component in three-axis directions and the moment component about the three-axes of the floor reaction force transmitted from the floor to each leg 2R(L) via the foot 22R(L), and outputs the detected signal to a control unit not shown.

Next, explanation will be given on the configuration of the knee joint 16R(L) of the leg 2R(L). The leg 2R(L) is symmetric, and explanation will be given on the knee joint 16R. Other joints may be of an arbitrary configuration, such as the known configuration proposed by the present Applicant in Japanese Patent Laid-Open No. H3-184782 and the like.

Figure 2:
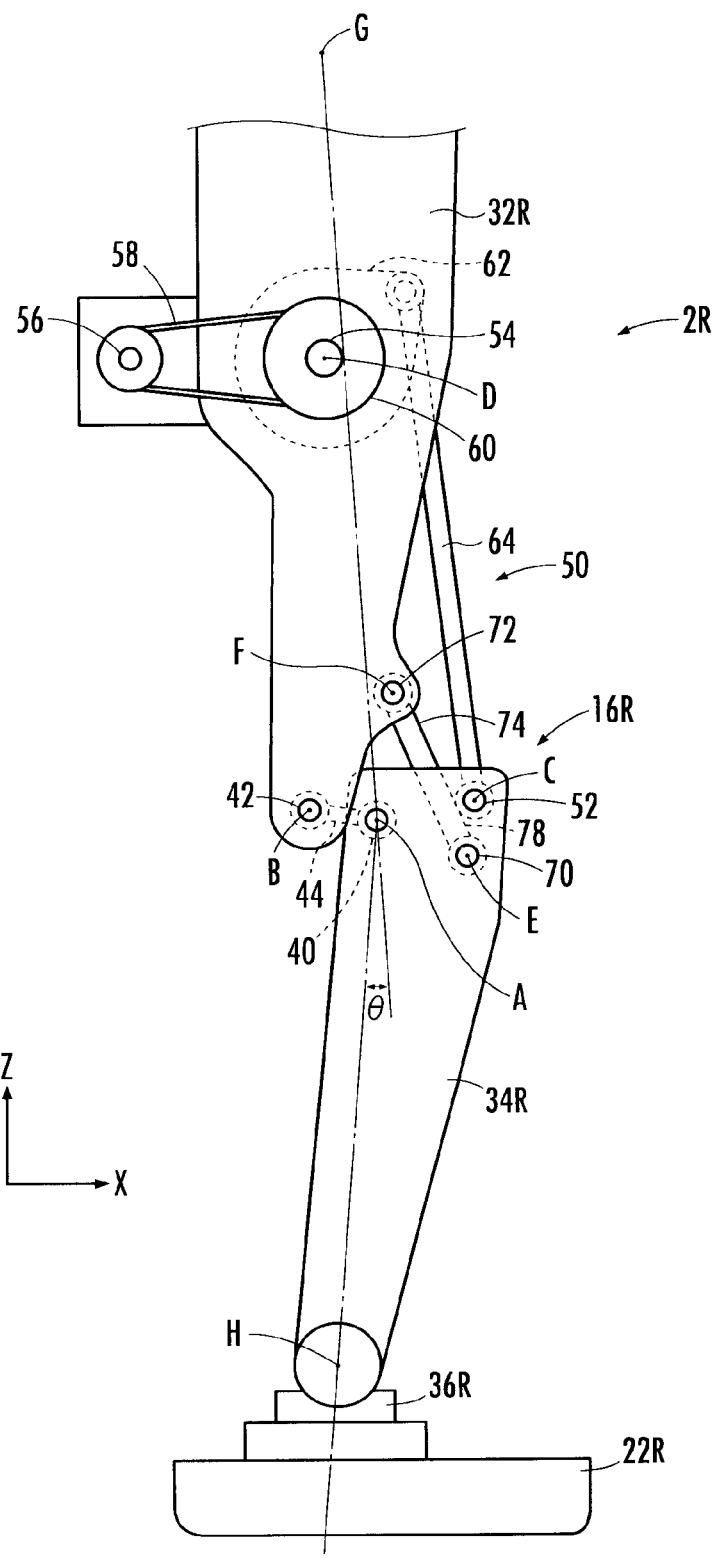
FIG. 2 is a side view showing a part of a leg.

As shown in FIG. 2, the knee joint 16R is equipped with a connecting rod 44, one end of which is connected so as to be freely rotatable with respect to an axis (a first axis) 40 of the crus link 34R, and the other end of which is connected so as to be freely rotatable to an axis (a second axis) 42 of the thigh link 32R. An axial center A of the axis 40 and an axial center B of the axis 42 are both provided in parallel to the Z-axis direction.

Further, the knee joint 16R is equipped with a driving mechanism 50 for bending and stretching the knee joint 16R. The driving mechanism 50 is a distance varying mechanism which changes the distance between an axis (a third axis) 52 of the crus link 34R and an axis (a fourth axis) 54 of the thigh link 32R.

More specifically, the driving mechanism 50 is configured from an electric motor 56 provided in the thigh link 32R, a rotating plate 62 which is rotary driven about the axis 54 by the output from the electric motor 56 being transmitted from a decelerating mechanism 60 via a belt 58, and a connecting rod 64, one end of which is connected so as to be freely rotatable to an end of the rotating plate 62, and the other end of which is connected so as to be freely rotatable to the axis 52.

An axial center C of the axis 52 and an axial center D of the axis 54 are both provided in parallel to the Z-axis direction. When a joint angle (bending angle) θ of the knee joint is 0 degree, a sum of the distance between the axis 40 and axis 42 and the distance between the axis 42 and the axis 54, is smaller than the distance between the axis 52 and the axis 54.

Further, the knee joint 16R is provided with a connecting rod 74, one end of which is connected so as to be freely rotatable with respect to an axis (a fifth axis) 70 of the crus link 34R, and the other end is connected so as to be freely rotatable to an axis (a sixth axis) 72 of the thigh link 32R. An axial center E of the axis 70 and an axial center F of the axis 72 are both provided in parallel to the Z-axis direction.

Next, explanation will be given on the operation of the knee joint 16R. With reference also to the frame format of FIG. 3, the crus link 34R is configured so that a point A is freely rotatable taking a point B of the thigh link 32R as a center thereof, but a point C is capable of changing the distance from a point D of the thigh link 32R by the driving mechanism. Further, regardless of the relative displacement of the crus link 34R with respect to the thigh link 32R, the distance between a point F of the thigh link 32 and a point E of the crus link 34R is constrained and is maintained constant.

The knee joint 16R is bendable and stretchable as is explained above, and the crus link 34R is relatively rotary driven with respect to the thigh link 32R taking the point A as an instantaneous rotational center. However, the relative displacement of the crus link 34R with respect to the thigh link 32R is defined uniquely.

Figure 3:
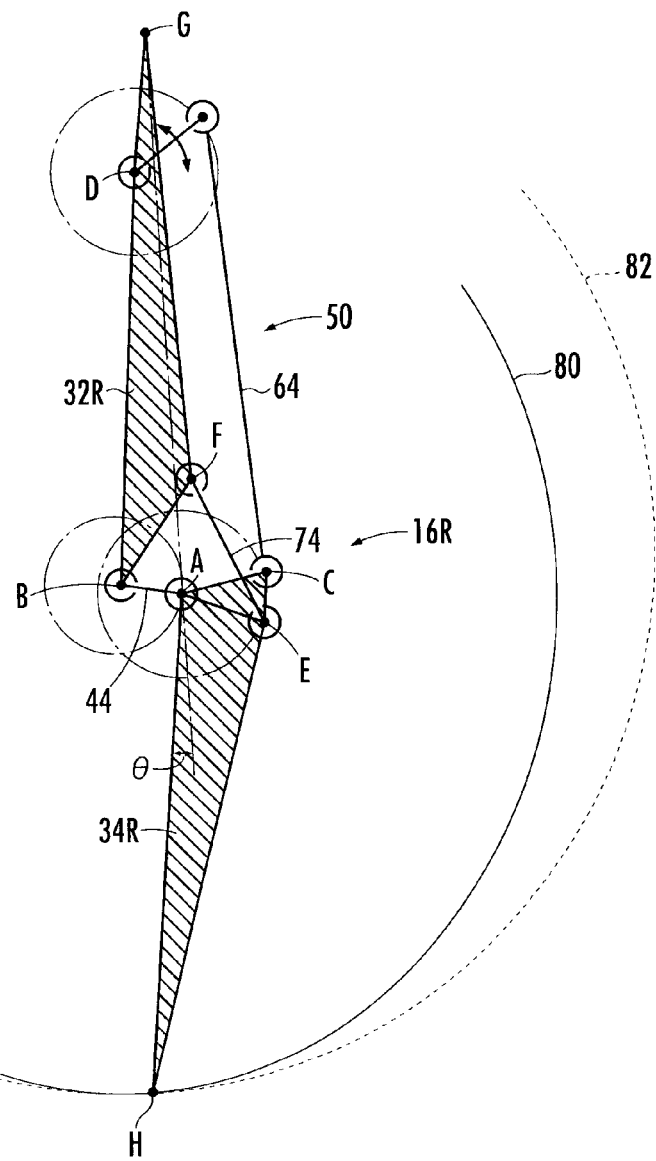
FIG. 3 is a view explaining a link configuration of a knee joint.

A moving trajectory 80 of a lower end point H (a rotational axis center of the ankle joint 18R) of the crus link 34R takes, as is shown by thin line in FIG. 3, an approximately ellipse shape. On the other hand, in a conventional robot in which the rotational center of the crus link with respect to the thigh link is constant as that shown in the above-mentioned Japanese Laid-open patent, a moving trajectory 82 of a lower end point of the crus link takes, as is shown by dotted line in FIG. 3, a circular shape.

Figure 4:
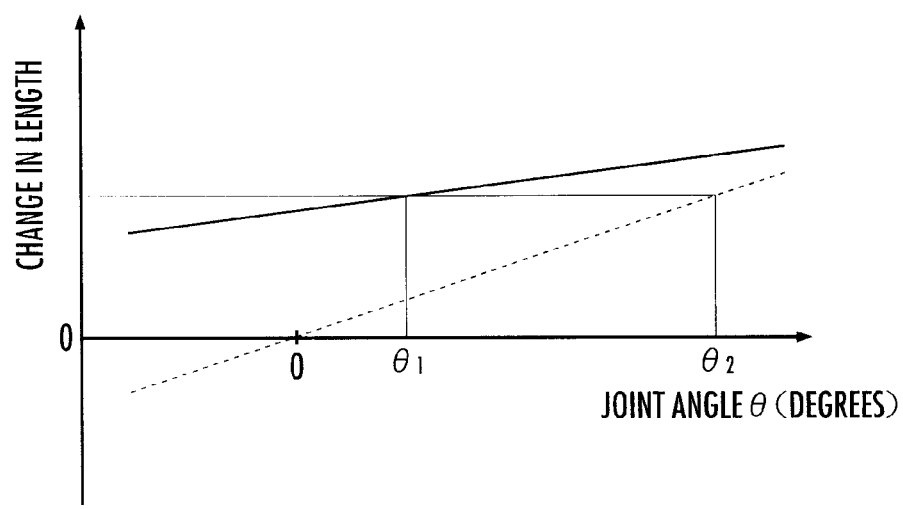
FIG. 4 is a graph showing a relationship between a knee joint angle and a change in length.

FIG. 4 shows a relationship between the change in length of the crus link 34R with respect to the thing link 32R, and the joint angle θ of the knee joint 16R. The change in length of the crus link 34R with respect to the thigh link 32R is taken as the change in length obtained by differentiating the distance between an upper end point G (a rotational axial center of the hip joint 14R) of the thigh link 32R and a lower point H of the crus link 34R by the joint angle θ.

In the conventional robot, as shown by dotted line in FIG. 4, the change in length becomes 0 when the joint angle θ is 0 degree. This means that, in the case where the joint angle θ is in the vicinity of 0 degree, the point H hardly moves even when the robot is driven to change the joint angle θ, so that it is inferior in drive controllability. Therefore, the drive control of the conventional robot had been carried out in a range of a joint angle θ2 or more in which the change of length become a predetermined value or more.

On the other hand, in the case of the robot 1 according to the present embodiment, the change in length does not become 0 when the joint angle θ become 0 degree, as is shown by solid line in FIG. 4. This means that, in the case where the joint angle θ is in the vicinity of 0 degree, the point H moves when the robot is driven to change the joint angle θ, so that it is excellent in drive controllability.

Further, when control is performed in the range of a joint angle θ1 or more in which the change in length becomes a predetermined value or more, as is the case with the conventional robot, the range of the joint angle θ excellent in drive controllability is increased with respect to the conventional robot by Δθ (=θ1−θ2), thereby making it possible to further extend the knee joint 16R.

Figure 5:
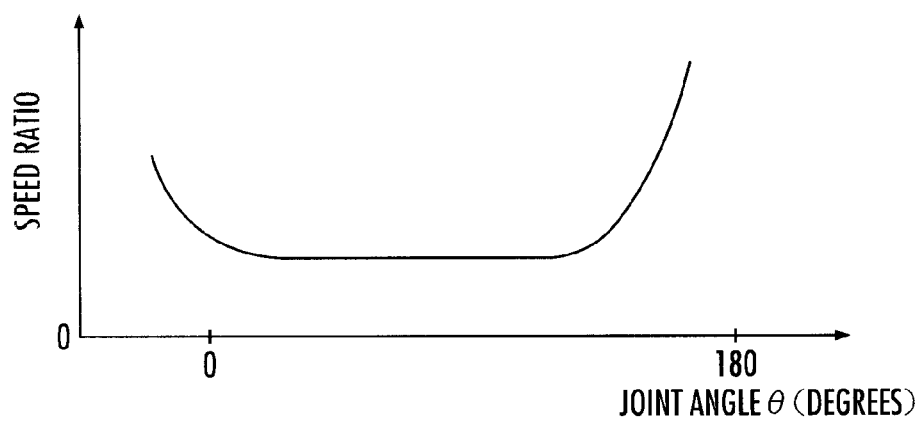
FIG. 5 is a graph showing a relationship between the knee joint angle and a speed ratio.

Further, FIG. 5 shows the relationship between a speed ratio obtained by dividing the rotational speed of the knee joint 16R by the rotational speed of the rotational plate 58 and the joint angle θ. From the figure, it is understood that the knee joint 16R has a speed increasing function of increasing the speed ratio when the knee joint angle θ is in the vicinity of 0 degree, and this further improves the drive controllability of the knee joint 16R.

As is explained above, the robot 1 is capable of extending the knee joint 16 while decreasing the joint angle θ than in the conventional robot by Δθ. Therefore, when the robot 1 is in an upright condition, it becomes possible to bring the knee joint 16 close to a fully-stretched state. This reduces the torque acting on the knee joint 16, so that the electric motor 56 may be made smaller in size and lighter in weight.

Further, it becomes possible to reduce the frequency of driving the hip joint 14 and the ankle joint 18 to bend or stretch, or the driving angle thereof. Still further, it becomes possible to bring the knee joint 16 of the supporting leg close to a fully-stretched state so that the knee thereof does not project forward. This suppresses the knee of the free leg from interfering with the knee of the supporting leg, improves the degree of freedom of the walking gait and the travel stability, thereby making it possible for the robot 1 to perform various motions.

The embodiment of the present invention had been explained above. However, the present invention is not limited thereto. For example, an explanation was given on the case where the drive mechanism of the present invention is configured from a crank-rod mechanism. But the present invention is not limited thereto. The distance varying mechanism may be configured using a linear driven rod, or a cam mechanism.

Further, the configuration of each joint or the arrangements of the joint axes are not limited to the present embodiment. For example, the joint axes may be configured so as to have 7 degrees of freedom or more, or 5 degrees of freedom or less.

Still further, the present invention is not limited to a bipedal robot. For example, the robot may be a four-legged mobile robot or a six-legged mobile robot and the like resembling an animal or an insect.

What is claimed is:

1. A legged mobile robot equipped with an upper body, and legs, each leg comprising a hip joint connecting the upper body and a thigh link, a knee joint connecting the thigh link and a crus link, and an ankle joint connecting the crus joint and a foot, in which the robot moves by driving the legs, the robot comprising;
   a connecting rod, one end of which is connected so as to be freely rotatable with respect to a first axis of the crus link, and the other end of which is connected so as to be freely rotatable to a second axis of the thigh link; and
   a distance varying mechanism which changes a distance between a third axis of the crus link and a fourth axis of the thigh link by a driving force from a driving source;
   wherein when a bending angle of the knee joint is 0 degree, a sum of the distance between the first axis and the second axis and the distance between the second axis and the fourth axis, is smaller than the distance between the third axis and the fourth axis.

2. The legged mobile robot according to claim 1, wherein a value obtained by differentiating a distance between a predetermined point of the thigh link and a predetermined point of the crus link by the bending angle of the knee joint does not become 0 when the bending angle of the knee joint is 0 degree.

3. The legged mobile robot according to claim 2, further comprising a second connecting rod, one end of which is connected so as to be freely rotatable with respect to a fifth axis of the crus link, and the other end of which is connected so as to be freely rotatable to a sixth axis of the thigh link.

4. The legged mobile robot according to claim 2, wherein the distance varying mechanism comprises:
   a rotating plate which is rotary driven by the driving source about the fourth axis; and
   a third connecting rod, one end of which is connected so as to be freely rotatable to an end of the rotating plate, and the other end of which is connected so as to be freely rotatable to the crus link at the third axis.

5. The legged mobile robot according to claim 3, wherein the distance varying mechanism comprises:
   a rotating plate which is rotary driven by the driving source about the fourth axis; and
   a third connecting rod, one end of which is connected so as to be freely rotatable to an end of the rotating plate, and the other end of which is connected so as to be freely rotatable to the crus link at the third axis.

6. The legged mobile robot according to claim 1, further comprising a second connecting rod, one end of which is connected so as to be freely rotatable with respect to a fifth axis of the crus link, and the other end of which is connected so as to be freely rotatable to a sixth axis of the thigh link.

7. The legged mobile robot according to claim 6, wherein the distance varying mechanism comprises:
   a rotating plate which is rotary driven by the driving source about the fourth axis; and
   a third connecting rod, one end of which is connected so as to be freely rotatable to an end of the rotating plate, and the other end of which is connected so as to be freely rotatable to the crus link at the third axis.

8. The legged mobile robot according to claim 1, wherein the distance varying mechanism comprises:
   a rotating plate which is rotary driven by the driving source about the fourth axis; and
   a third connecting rod, one end of which is connected so as to be freely rotatable to an end of the rotating plate, and the other end of which is connected so as to be freely rotatable to the crus link at the third axis.

* * * * *